US010647351B2

(12) United States Patent
Bain et al.

(10) Patent No.: US 10,647,351 B2
(45) Date of Patent: May 12, 2020

(54) ROBOTIC PLATFORM WITH WHEELED LEGS AND VIRTUAL DIFFERENTIAL TRANSMISSION

(71) Applicant: Cardinal Gibbons High School, Raleigh, NC (US)

(72) Inventors: Christopher Randall Bain, Knightdale, NC (US); Miguel Douglas Chavez, Raleigh, NC (US); Michael Reilly Comstock, Raleigh, NC (US); Thomas Anthony Connor, Apex, NC (US); Evan Patrick Elezaj, Apex, NC (US); Nathan Michael Kearney, Raleigh, NC (US); Oliver Dacey McCann, Cary, NC (US); Alyssa Mary Nicholas, Raleigh, NC (US); Austin Carlyle Inman Reiss, Raleigh, NC (US); Jon Ryan Riley, Cary, NC (US); Samuel John Hazinski, Chapel Hill, NC (US); Katharine Miranda Priu, Raleigh, NC (US)

(73) Assignee: Cardinal Gibbons High School, Raleigh, NC (US)

( * ) Notice: Subject to any disclaimer, the term of this patent is extended or adjusted under 35 U.S.C. 154(b) by 207 days.

(21) Appl. No.: 15/819,270

(22) Filed: Nov. 21, 2017

(65) Prior Publication Data

US 2018/0154933 A1  Jun. 7, 2018

Related U.S. Application Data

(60) Provisional application No. 62/431,152, filed on Dec. 7, 2016.

(51) Int. Cl.
*B62D 11/00* (2006.01)
*B60K 1/02* (2006.01)
(Continued)

(52) U.S. Cl.
CPC ............ *B62D 11/003* (2013.01); *B60B 19/12* (2013.01); *B60K 1/00* (2013.01); *B60K 1/02* (2013.01);
(Continued)

(58) Field of Classification Search
CPC ........ B62D 11/03; B62D 61/10; B62D 11/04; B62D 11/003; B60K 1/02; B60K 17/356;
(Continued)

(56) References Cited

U.S. PATENT DOCUMENTS 8,794,386 B2   8/2014   Keeling et al.
9,211,922 B2   12/2015  Keeling et al.
(Continued)

OTHER PUBLICATIONS

Bain et al., "Robotic Platform With Wheeled Legs and Virtual Differential Transmission" U.S. Appl. No. 62/431,152, filed Dec. 7, 2016, Expired, 32 pages.
(Continued)

*Primary Examiner* — Abby Y Lin
*Assistant Examiner* — Martin A Weeks
(74) *Attorney, Agent, or Firm* — Haynes and Boone, LLP

(57) ABSTRACT

A robotic vehicle is provided with a novel wheel design and a virtual differential transmission. The novel wheels are generally rounded with scallops along the outer periphery permitting secure engagement of irregular terrain structures, such as the rungs of an inclined ladder. The virtual differential transmission employs rotational sensors in independently driven wheels to maintain information on the relative rotational position of left- and right-side wheels. When necessary, the relative rotational position information is used to selectively drive the left- or right-side wheel until the scallops in a left-side wheel are horizontally aligned with the scallops in a right-side wheel. Thus, the virtual differential transmission can realign the scallops in left- and right-side
(Continued)

wheels to facilitate their mutual engagement with a terrain structure, such as a ladder rung.

19 Claims, 12 Drawing Sheets

(51) Int. Cl.
| | |
|---|---|
| *G05D 1/02* | (2020.01) |
| *B62D 61/10* | (2006.01) |
| *B62D 11/04* | (2006.01) |
| *B60K 17/35* | (2006.01) |
| *B60K 7/00* | (2006.01) |
| *B60K 1/00* | (2006.01) |
| *B60B 19/12* | (2006.01) |
| *B60B 3/10* | (2006.01) |
| *B60K 17/356* | (2006.01) |
| *B60K 17/354* | (2006.01) |

(52) U.S. Cl.
CPC .......... *B60K 7/0007* (2013.01); *B60K 17/354* (2013.01); *B60K 17/356* (2013.01); *B62D 11/04* (2013.01); *B62D 61/10* (2013.01); *G05D 1/0234* (2013.01); *B60B 3/10* (2013.01); *B60K 2007/0038* (2013.01); *B60K 2007/0061* (2013.01); *B60Y 2200/20* (2013.01); *B60Y 2200/46* (2013.01)

(58) Field of Classification Search
CPC ...... B60K 17/354; B60K 7/0007; B60K 1/00; B60K 2007/0061; B60K 2007/0038; B60B 3/10; B60B 19/12; G05D 1/0234; B60Y 2200/46; B60Y 2200/20
See application file for complete search history.

(56) References Cited

U.S. PATENT DOCUMENTS

| | | | |
|---|---|---|---|
| 9,864,369 B2 | 1/2018 | Gravel et al. | |
| 10,384,338 B2 | 8/2019 | Greene et al. | |
| 2011/0098151 A1* | 4/2011 | Ziemer | ................ B60K 6/485 |
| | | | 477/20 |
| 2011/0160963 A1* | 6/2011 | Yasui | ................... B62D 11/003 |
| | | | 701/41 |

OTHER PUBLICATIONS

Greene et al., "Self-Lifting Robot With Automatic Release and Multi-Jointed Arm" Utility U.S. Appl. No. 16/573,662, filed Sep. 17, 2019, Pending, 66 pages.

* cited by examiner

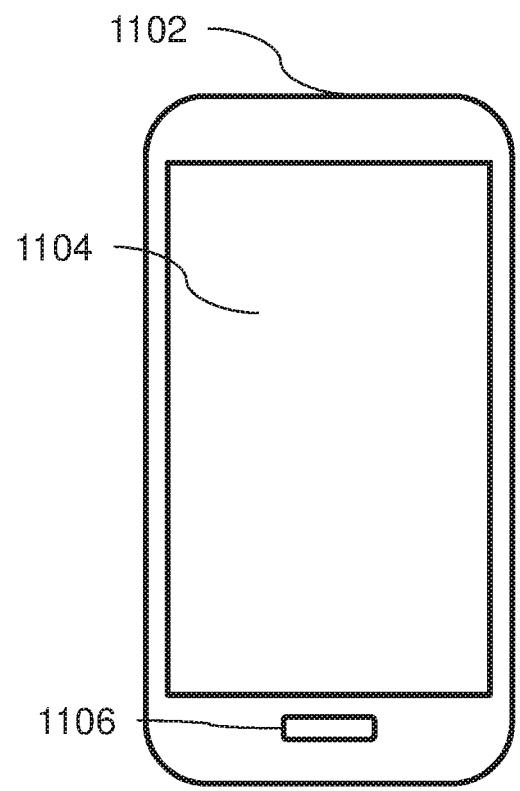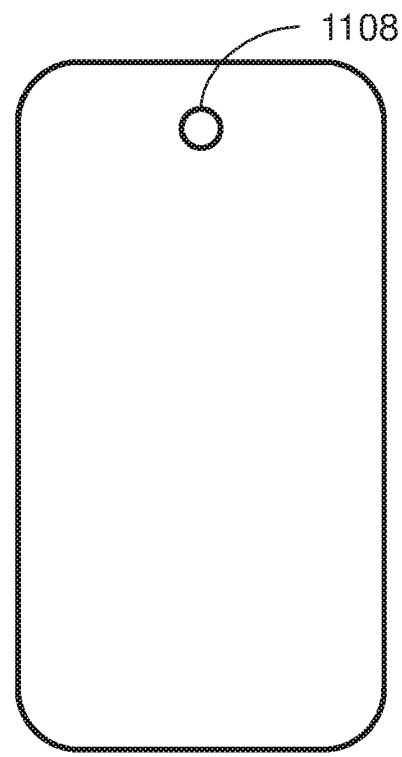
Fig. 11a    Fig. 11b
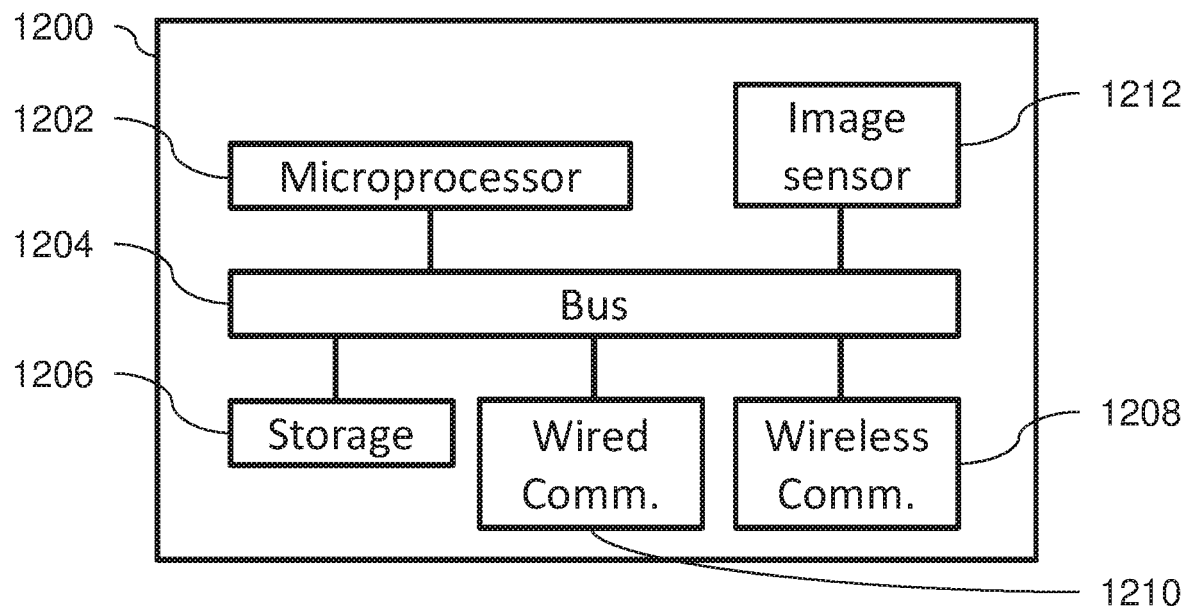
Fig. 12

ROBOTIC PLATFORM WITH WHEELED LEGS AND VIRTUAL DIFFERENTIAL TRANSMISSION

PRIORITY CLAIM

This application claims the benefit of U.S. Provisional Application No. 62/431,152, filed Dec. 7, 2016.

BACKGROUND OF THE INVENTION

The present invention generally relates to robotic vehicles and, in a representatively illustrated embodiment thereof, more particularly relates to a specially designed robotic vehicle with wheeled legs and a virtual drive transmission.

In the construction of small robotic vehicles which manipulate objects, one of the design challenges presented is to provide the vehicle with a flexible driving capability for maneuvering over a variety of types of terrain. In some instances, a circular wheel may perform well on flat or substantially smooth terrain, but perform poorly, or not at all, on rough or irregular terrain. The need to traverse various types of terrain is particularly acute with robotic vehicles intended for disaster assistance or search-and-rescue functions.

In view of these design difficulties it can be seen that a need exists for a robotic platform equipped with a drive system capable of traversing various types of terrain. It is to this need that the present invention is primarily directed.

BRIEF DESCRIPTION OF THE DRAWINGS

FIG. 11a is a front view of a programmable computer;

FIG. 11b is a rear view of a programmable computer;

FIG. 11 is a process flow diagram for a method of playing back a series of recorded commands;

FIG. 12 is logical view of components included within a programmable computer;

DETAILED DESCRIPTION

Figure 1:
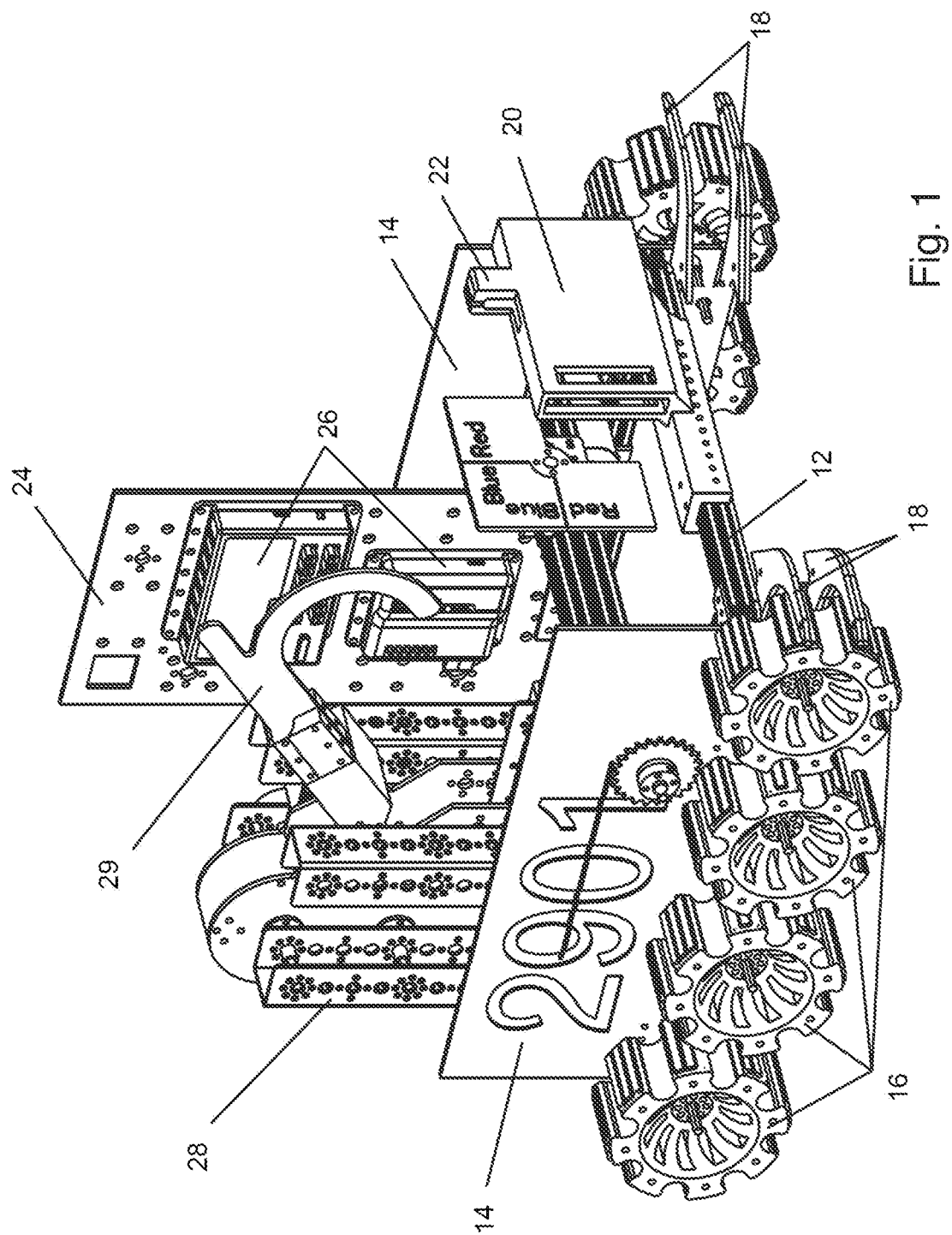
FIG. 1 is a perspective view of an illustrative robotic vehicle embodying principles of the present invention.

Illustrated in FIG. 1 is a robotic vehicle 10 having a frame 12 supporting a variety of additional components, including sidewalls 14. The frame 12 may be made from any suitable material and is preferably composed of metal beams, such as steel or aluminum. In one embodiment, the frame 12 includes beams with pre-drilled holes to allow the beams to be quickly and easily attached or detached to one another.

The sidewalls 14 may be made from any suitable material and are preferably a lightweight plastic, such as Lexan. The frame 12 can drive over varied terrain via a plurality of wheels 16 (representatively shown with four wheels on each side). As further discussed below, the wheels include treaded portions and scalloped portions to provide multi-terrain driving capabilities. Owing to the unique and novel capabilities provided by the integration of both treaded and scalloped portions, and in particular the ability of such wheels to "step over" certain terrain features, applicants also refer to such wheels as described herein as wheel-legs, or "WEGs."

Attached to frame 12 are front fenders 18 positioned to extend around and in front of the foremost wheels 16 on each side. The front fenders, which may be composed of Lexan, are operable to push loose debris that the robotic vehicle 10 encounters. Although the front fenders are optional, the applicants have found that without front fenders 18 the robotic vehicle 10 when driven forward into loose debris, may drive up onto the debris in an undesired manner. For example, the robotic vehicle 10 may become unstable or high-centered on the loose debris. Thus, applicants have found it advantageous for the robotic vehicle 10 to push loose debris out of its path using front fenders 18. As illustrated, the robotic vehicle 10 has two vertically spaced-apart front fenders 18 on each side, but more or fewer front fenders are also contemplated. The front fenders 18 may also, or alternatively, push loose debris toward the centerline of the robot so that the robot may pass over the loose debris. The robotic vehicle 10 and its components may be sized as appropriate for an intended task. In one embodiment, the dimensions of the robotic vehicle 10 are less than about 18 inches wide, less than about 18 inches long, and less than about 18 inches high.

Attached to the frame 12 is a main controller mount 20. The main controller mount 20 is preferably composed of plastic, and may be fabricated using 3-D printing. The main controller mount 20 is designed to hold a programmable computer with an integrated camera function (not shown) in a vertical orientation. In one embodiment, the programmable computer may be a mobile handset, as described further with respect to FIGS. 11 and 12, that includes an image sensor, programmable microprocessor, nonvolatile storage, one more wired communication interfaces, and one or more wireless communication interfaces. The mobile handset may be, for example, a smartphone employing the Android operating system from Google. Thus, in an embodiment in which the camera module is provided by a mobile handset, the mobile handset further provides storage, computing, and communication capabilities that are employed to control robotic vehicle under both an autonomous mode and a human-controlled mode. In other embodiments, an image sensor may be mounted in place of the main controller mount 20, and a programmable computer may be mounted elsewhere on frame 12 to provide suitable storage, computing, and communication capabilities. In such an embodiment, the programmable computer may be, for example, a LEGO® MINDSTORMS® NXT Intelligent Brick available (or previously available) from the LEGO Group.

The main controller mount 20 may include a wire catch 22 to securely hold a communication wire that may plug into the programmable computer, thereby preventing accidental disconnection of a wire from the programmable computer during operation of the robotic vehicle 10.

Also attached to the frame 12 is a riser 24, which may be made from any suitable material but is preferably composed of a lightweight plastic, such as Lexan. Attached to riser 24 may be one or more controllers 26 (illustratively, two controllers 26 are shown). The controllers 26 may include various capabilities, including battery controllers, power distribution controllers, motor controllers, communication controllers, and the like. In one embodiment, the controllers 26 include one or more controllers available from Modern Robotics, Inc. of Miami, Fla., such as a Core Power Distribution Module, Core Motor Controller, or Core Servo Controller. In some embodiments, a controller 26 may provide multiple capabilities, for example, an integration of both motor control and communication control. Some controllers 26 may be programmable.

Also attached to frame 12 is arm 28. The arm 28 is preferably equipped with multiple points of articulation to allow for flexible manipulation of objects of various sizes. The arm 28 may include portions that are controllably extendable, thereby facilitating use of the arm 28 to reach objects that may be located on terrain in the vicinity of robotic vehicle 10, as well as objects located higher, including up to several feet above the surface of the terrain. The arm 28 may further include portions that roll up or otherwise collapse to allow for compact storage. For example, one or more portions of the arm 28 may include a linear slide, which may include multiple segments. The arm 28 may include a servo-controlled claw for grasping and manipulating objects. As illustrated, the arm 28 includes a hook 29.

Figure 2:
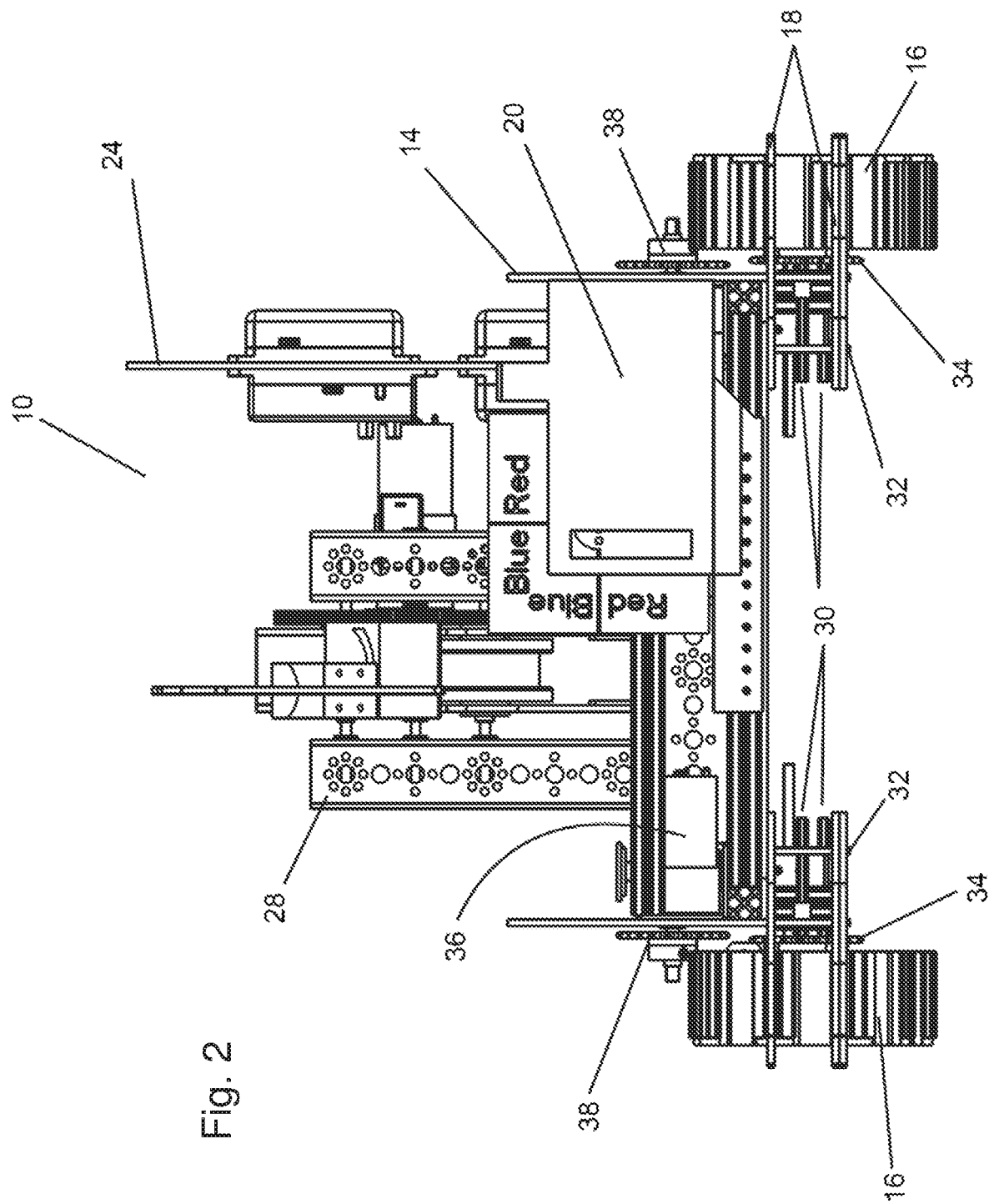
FIG. 2 is a front side view of an illustrative robotic vehicle.

Turning now to FIG. 2, illustrated is a front view of the robotic vehicle 10. The wheels 16 are mounted on axles 30. Each axle 30 extends through sidewall 14 and through an undercarriage wall 32, which is spaced apart from the sidewall 14. On each axle 30, between each wheel 16 and the sidewall 14, is a gear 34. A first drive motor 36 is attached to the frame 12 and is coupled to a drive gear 38 that is aligned with the gears 34 on one side of the robotic vehicle 10. The wheel gears 34 may be coupled to the drive gear 38 by a chain or belt (not shown). In this way, energy supplied to the drive motor 36 causes a rotation of drive gear 38, which is transferred by the chain or belt to gears 34, which then rotate axles 30 and the attached wheels 16.

A substantially similar drive system is provided on the opposite side of the robotic vehicle. A second drive motor 36 (obscured by main controller mount 20) is attached to the frame 12 and a second drive gear 38 that is aligned with the gears 34 on the other side of the robotic vehicle 10. A second chain or belt (not shown) couples the drive gear 38 to the wheel gears 34.

The first and second drive motors 36 may be operatively connected to a motor controller mounted on riser 24. The first and second drive motors 36 may be separately controllable, such that each drive motor may be driven in either a forward or reverse direction at multiple speeds independently of any action (or inaction) by the other drive motor. In this way, the robotic vehicle 10 is provided with a flexible driving capability with forward, reverse, and turning capabilities.

In one embodiment, each driver motor 36 includes an integrated rotational position sensor capable of producing an output representative of the rotational position of the drive motor 36's output shaft. The sensor output may be analog or digital, but are preferably digital. A digital output may range over a defined set of values, for example, from 0 to 280. A given output value indicates a defined rotational position of the output shaft relative to the remainder of the drive motor 36. Thus, the output value of 0 is output when the output shaft is at a specific rotational position state, regardless of how many times (and in what direction) the output shaft may have rotated before reaching that state. In other embodiments, a rotational position sensor may be external to the drive motor, for example, by being attached to idler gear 40.

Figure 3:
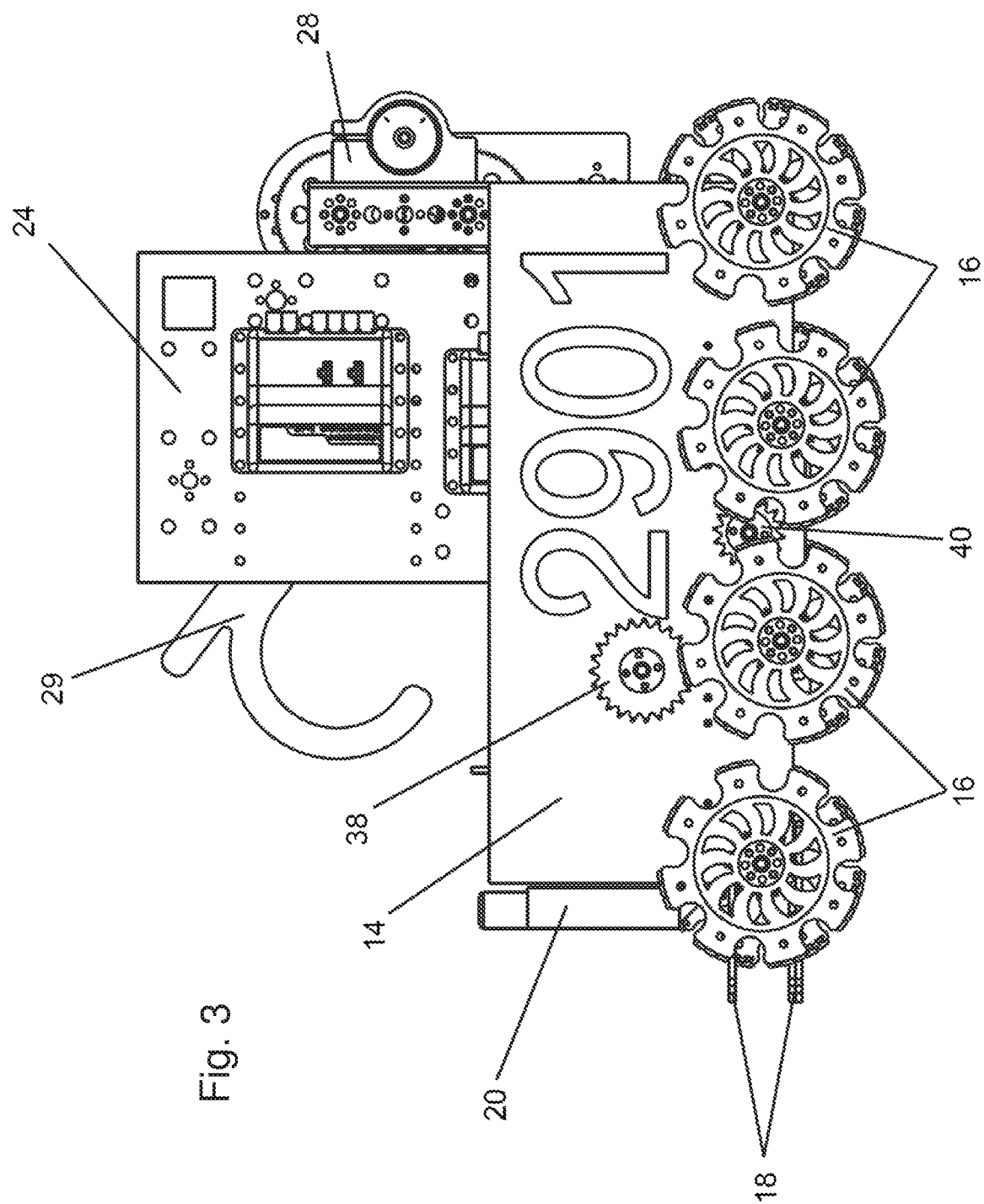
FIG. 3 is a left side view of an illustrative robotic vehicle.
Figure 4:
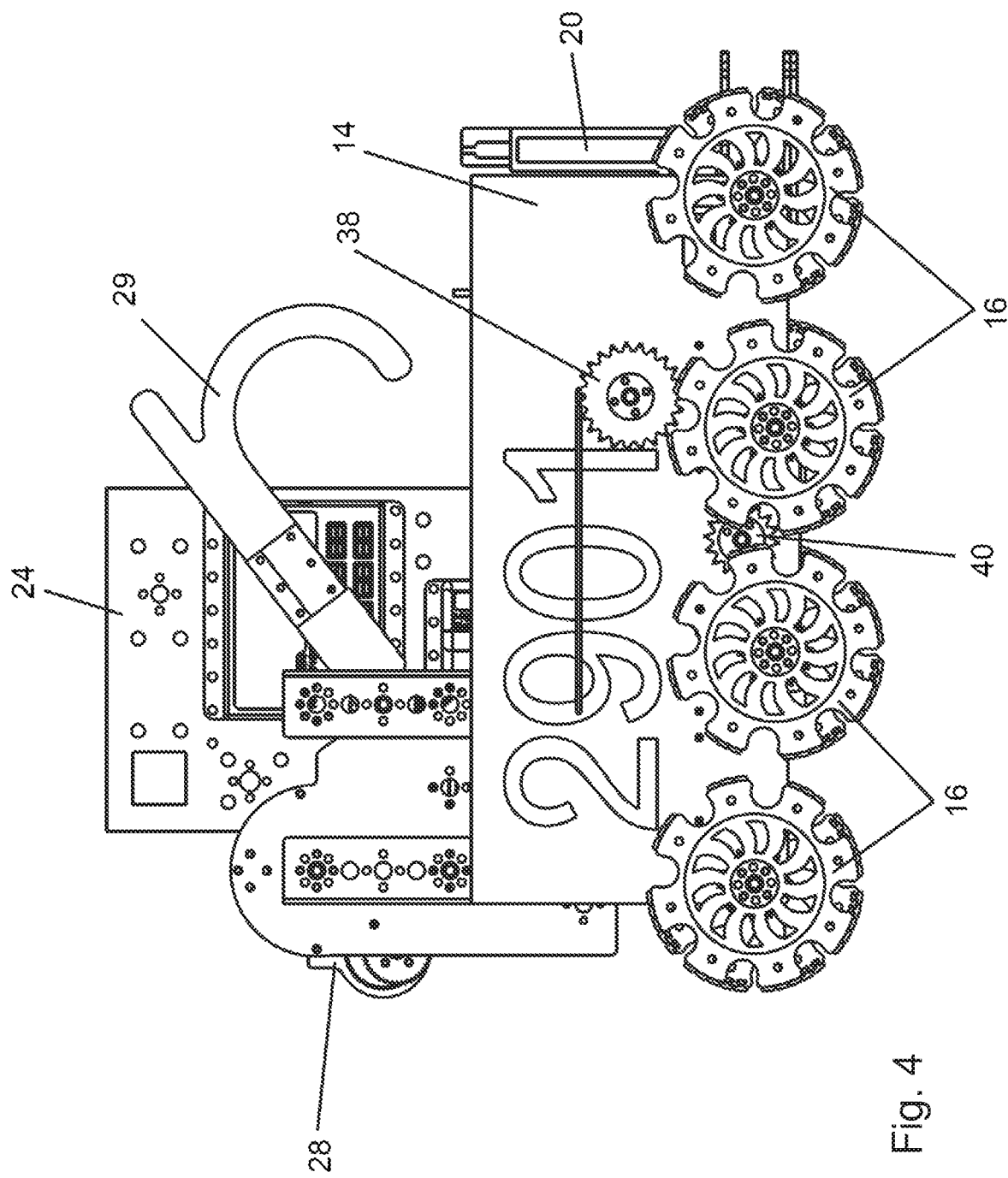
FIG. 4 is a right side view of an illustrative robotic vehicle.

Turning now to FIG. 3, illustrated is a left side view (FIG. 3) and a right side view (FIG. 4) of the robotic vehicle 10. The wheels 16 may be vertically offset, such that certain wheels are not in contact with the terrain when the terrain is a planar surface. For example, as illustrated in FIGS. 3 and 4, the fore-most and aft-most wheels, on both the left and right sides, are elevated with respect the two middle pairs of wheels. Thus, when the robotic vehicle 10 is driven on a planar surface, such as a flat floor, only the middle pairs of wheels contact the surface.

As previously discussed, a gear 34 on each wheel 16 is operatively coupled to a drive 38. To control the tension, and to eliminate slack, in the drive chain or belt, an idler gear 40 is provided.

Figure 5:
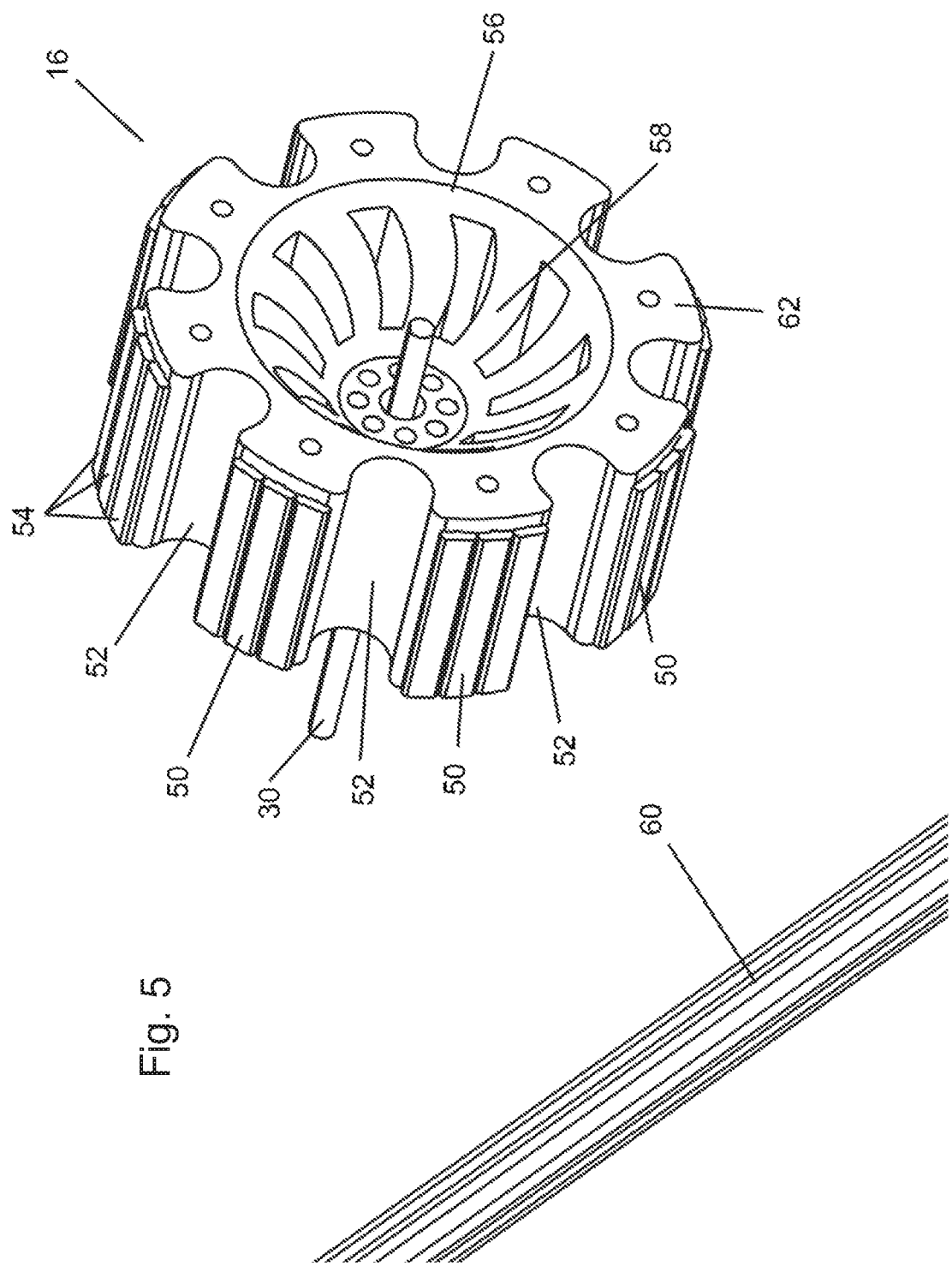
FIG. 5 is a perspective view of a wheel.

Turning now to FIG. 5, illustrated is an outside perspective view of a wheel 16 attached to an axle 30. The wheel 16 includes a core 56.

The outer circumference of the core 56 includes alternating tread portions 50 and scallop portions 52. Each tread portion 50 includes three tread plates 54, although more or fewer tread plates are also possible. The tread plates 54 are preferably an elastomeric plastic material, such as a synthetic rubber, to provide traction when in contact with a driving surface. Each tread plate 54 may have a roughly I-shaped or T-shaped cross-section to facilitate easy but secure attachment. In one embodiment, each tread plate 54 is a TETRIX® snap-together tank tread chain link as manufactured by Pitsco Education.

The core 56 further includes scallops portions 52 along its outer circumference between each tread portion 50. Each scallop portion is a negative space, preferably having a generally rounded, concave shape. The depth and width of each scallop portion may be adjusted to suit the needs of a particular application. Preferably, each scallop portion 52 around the circumference of the core 56 is equally sized. In one embodiment, the scallop portions 52 are sized to cooperatively engage a bar 60 when the bar is substantially parallel to axle 30. As described in more detail below, the bar 60 may be part of a ladder, for example.

The core 56 further includes a hub area 58 that is preferably generally recessed in a concave fashion. The generally concave recess of the hub area 58 provides a space for attachment hardware coupling the core 56 to axle 30. Any suitable attachment hardware may be employed, such as, for example, a retaining clip or a nut. The concave recess is preferably sized so that any attachment hardware does not extend beyond the outer plane 62 of the core 56.

Figure 6:
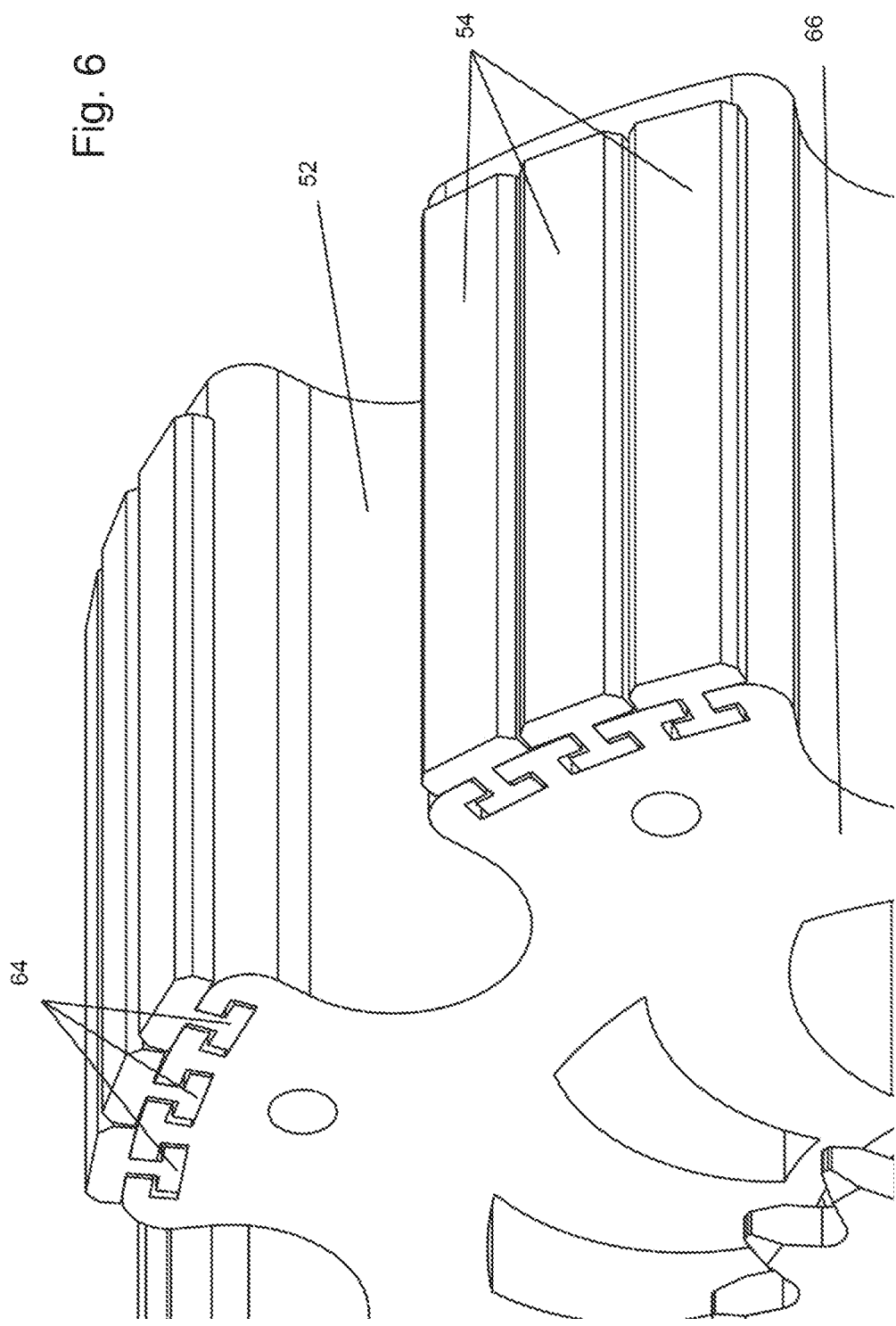
FIG. 6 is a perspective view of a portion of a wheel.

Turning now to FIG. 6, illustrated is a detailed inside perspective view of a portion of a wheel 16. Each tread plate 54 may be captively secured to the core 56 in an elongate, T-shaped slot 64. Advantageously, each T-shaped slot 64 is open on the inner plane 66 of the core 56, but does not extend to the outer plane 62. In this way, the tread plates 54 are captive within the core 56 and cannot slide outwardly (and potentially entirely off of core 56) during operation. To retain the tread plates 54 and prevent them from sliding inwardly during operation (and potentially becoming entangled with the drive chain or belt), a cover plate (not shown) may be affixed on the inner side the core 56. The cover plate may be composed of lightweight plastic, such as Lexan. With the cover plate affixed, the tread plates 54 cannot slide out from the T-shaped slot 64 while the wheel 16 is attached to the robotic vehicle 10.

Figure 7:
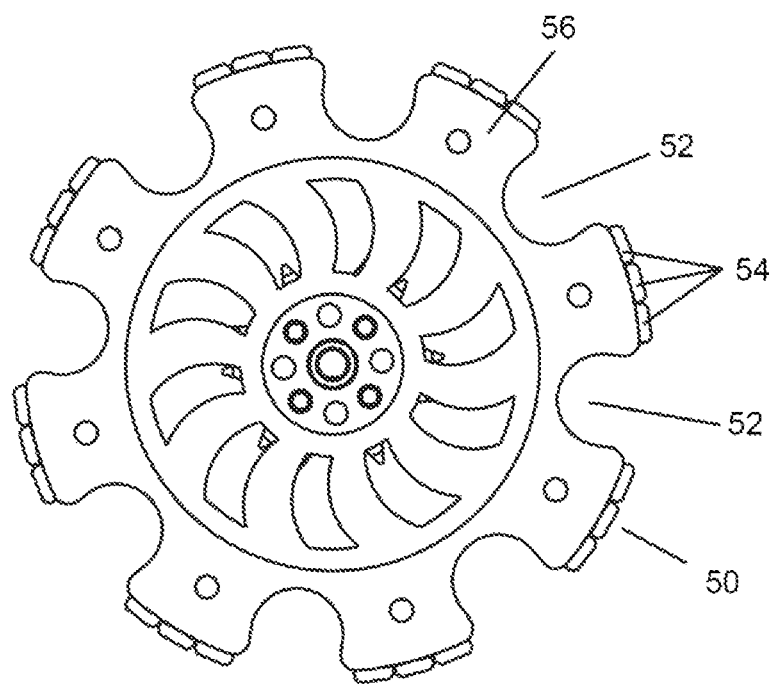
FIG. 7 is an outer side view of a wheel.
Figure 8:
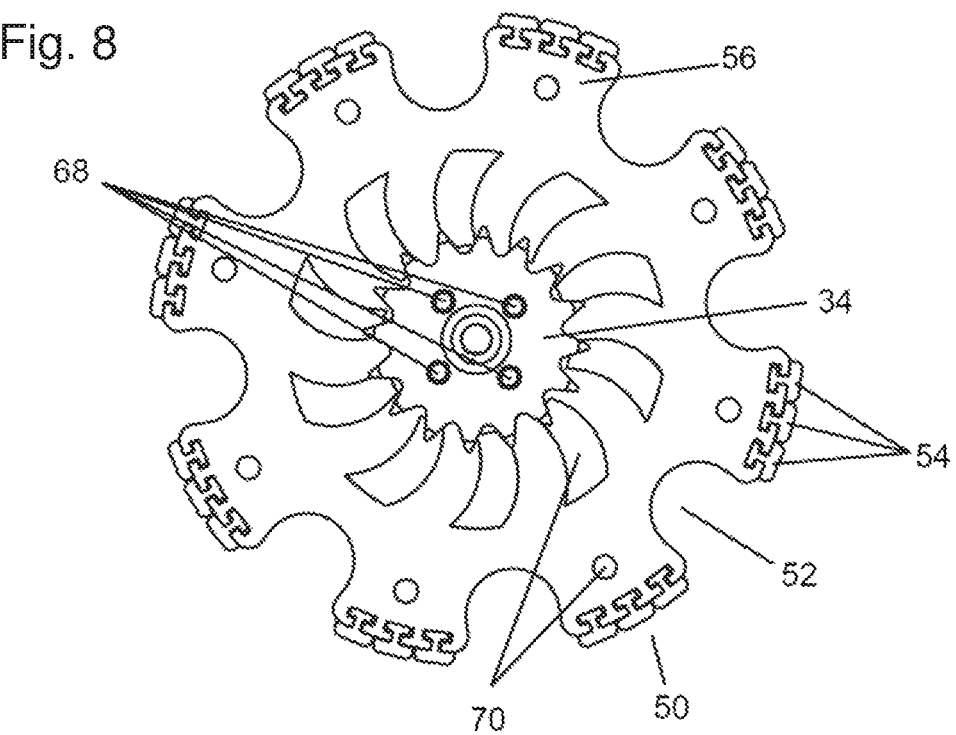
FIG. 8 is an inner side view of a wheel.

Illustrated in FIG. 7 is a side view of the outer side (FIG. 7) and the inner side (FIG. 8) of a wheel 16. As shown, the core 56 includes eight treaded portions 50 and eight scalloped portions 52, although more or fewer are possible. The core 56 may be fixedly secured to gear 34 using multiple bolts through holes 68.

The core 56 may be any suitable material and is preferably a rigid plastic. The core 56 may be produced via a 3-D printing technique. To reduce the weight, cost, and fabrication time of the core 56, one or more negative spaces 70 may be included in the design of core 56. The negative spaces 70 may be any size and shape that does not interfere with the structural integrity of the core 56. In one embodiment, the negative spaces 70 are arranged in an aesthetically pleasing design.

The gear 34 attached to wheel 16 is preferably the same size, and has the same number of teeth, as drive gear 38. Thus, one rotation of the drive motor 36 results in one rotation of drive gear 38, one rotation of gear 34, and therefore one rotation of wheel 16. Accordingly, the rotational position sensor incorporated into the drive motor 36 provides an accurate proxy value that is indicative of the relative rotational position of the wheels 16.

The rotational position sensor is communicatively coupled to the programmable computer, for example, via the a wired interface. Thus, the rotational position information may be available to a software routine executing on the programmable computer.

Figure 9:
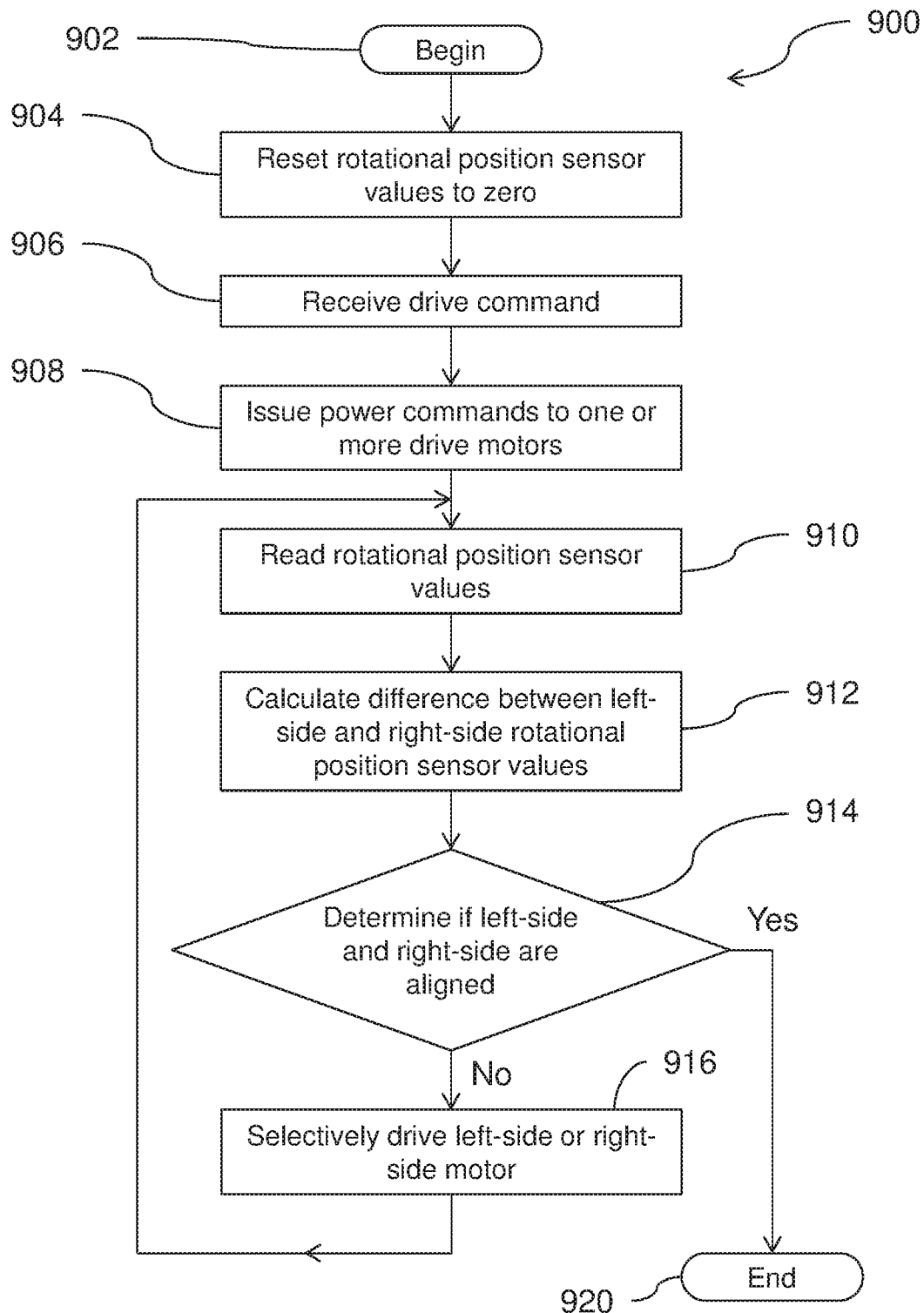
FIG. 9 is a process flow diagram for a method of providing a virtual differential.

Turning now to FIG. 9, illustrated is a method 900 for providing a virtual differential. In step 902, the method begins. In step 904, the encoder values for the left-side rotational position sensor and the right-side rotational position sensor are reset to zero. Preferably, this resetting is achieved electronically, such as by sending a reset command to the rotational position sensors. In other embodiments, the left- and right-side drive motors may be caused to turn until the rotational position sensors provide a zero output.

In step 906, a drive command is received. The drive command may be received from either an autonomous control program or a human operator. The drive command may be to drive forward, to drive in reverse, to turn left, or to turn right. The drive command may further provide information regarding a desired drive speed.

In step 908, one or more commands are issued to cause the rotation of the left-side drive motor, the right-side drive motor, or both. The rotation of the left-side drive motor may be the same direction as the right-side drive motor, or they may be in opposite directions. The commands to cause rotation may be sent through a wired or wireless communication interface to a motor controller, which then controllably delivers power to one or both drive motors in accordance with the one or more commands.

In step 910, the rotational sensor position values are read for the left-side and right-side drive motors. The rotational sensor position values may be in any suitable number format, and in one embodiment the rotational sensor position values comprise integers in a range of 0 to 279. In other embodiments, the rotational sensor position values may be floating point values and may include negative values.

In step 912, the absolute difference between the left-side rotational position sensor value and the right-side rotational position sensor value is calculated, for example, by subtraction.

In step 914, the difference value calculated in step 912 is evaluated to determine whether the left-side and right-side drive systems are aligned. This step depends on the specific geometry of the drive systems, and in particular, on the configuration of treaded portions 50 and scalloped portions 52 of the wheels 16. This step also depends on the range of rotational position sensor values. In one example, the rotational position sensor values range from 0 to 279 (for a total of 280 possible values). As illustrated in the figures, exemplary wheels 16 include eight equally spaced treaded portions 50 and eight equally spaced scalloped portions 52. Thus, the treaded portions 50 and scalloped portions 52 repeat identically with every one-eighth turn of the wheel 16. A one-eighth turn of wheel 16 corresponds to a change of rotational position sensor value of 280/8, or 35. Accordingly, in this example, the left-side and right-side drive structures will be in alignment (that is, in the same relative alignment as they were at step 902) when the difference between the left-side rotational position sensor value and the right-side rotational position sensor value is zero or an even multiple of 35. Thus, the amount of misalignment between the left-side and right-side may be measured by the difference value modulo 35. If the difference value modulo 35 is below a threshold, then it is determined that the left-side and right-side are sufficiently aligned, and the process continues to step 920. If the difference value modulo 35 exceeds that threshold, then it is determined that the left-side and the right-side are not aligned, and the process continues to step 916.

In step 916, a command is issued to cause the rotation of either the left-side drive motor or the right-side drive motor. The selection of which side to drive may depend on various factors, including for example, depending on which side was previously driven in step 908. If, for example, only one side was driven in step 908, then the same side may be selected for driving in step 916. The drive command issued in step 916 may be a small incremental drive command that causes a small, and potentially low-speed, rotation of the commanded drive motor based on the difference value calculated in step 914. The issued command in step 916 causes a rotation of one of the drive motors intended to reduce or eliminate the misalignment of the left-side and right-side drive systems (as measured by the difference value of step 914).

Following step 916, the process returns to step 910.

In step 920, the process ends.

The beneficial operation of robotic vehicle 10 will now be described. The main controller includes stored programming allowing the robotic vehicle 10 to be operated in two modes. In an autonomous mode, the robotic vehicle 10 operates in accordance with preprogrammed instructions and without any human input. The operation of the vehicle in autonomous mode is not entirely predetermined, however, as sensor inputs may be processed and influence the operation of the robotic vehicle 10.

The robotic vehicle 10 may also be operated in a human-driver mode. In the human-driver mode, the robotic vehicle 10 operates in accordance with instructions provided by a human, such as through the use of a handheld remote controller that may be equipped with one or more joystick inputs and one or more buttons. The received instructions are passed to a motion program that sends signals to the various motors and servos that comprise the robotic vehicle 10. The instructions are preferably received by the robotic vehicle 10 the wireless communication interface.

In either mode, any drive commands for causing movement of the robotic vehicle 10 are processed using the method 900. In this way, after each drive command, the robotic vehicle 10 automatically realigns, if necessary, its left-side and right-side drive systems such that the unique design patterns on the wheels (e.g., the treaded portions 50 and the scalloped portions 52) contact the terrain in synchrony. Thus, the drive systems are effectively maintained in substantially continuous alignment.

Figure 10A:
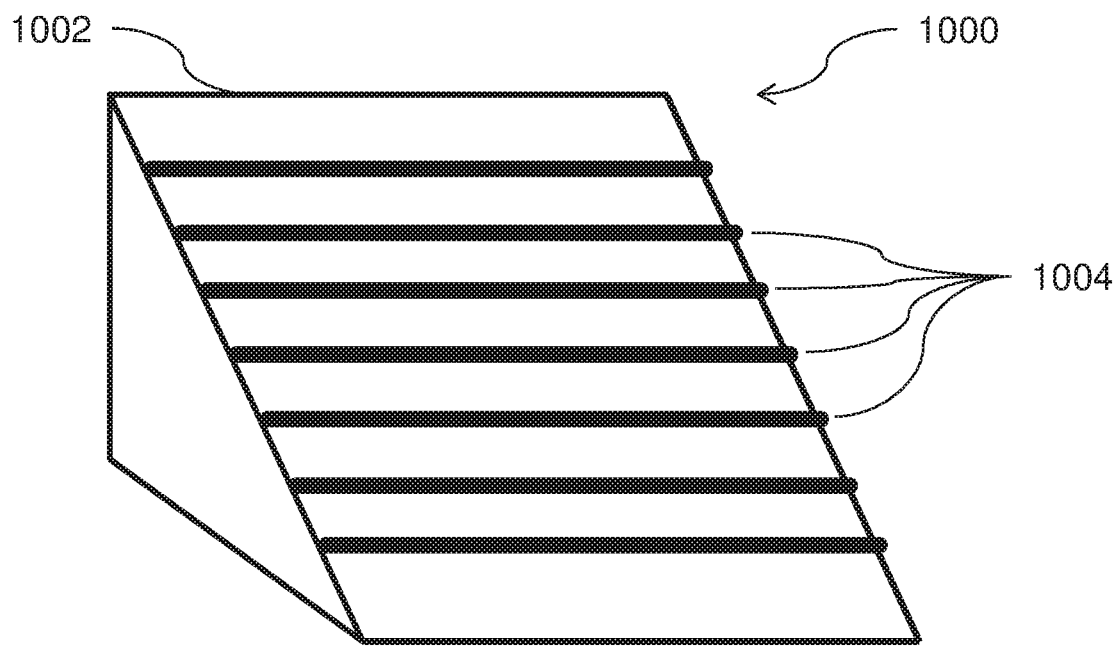
FIG. 10a is a perspective view of a terrain.
Figure 10B:
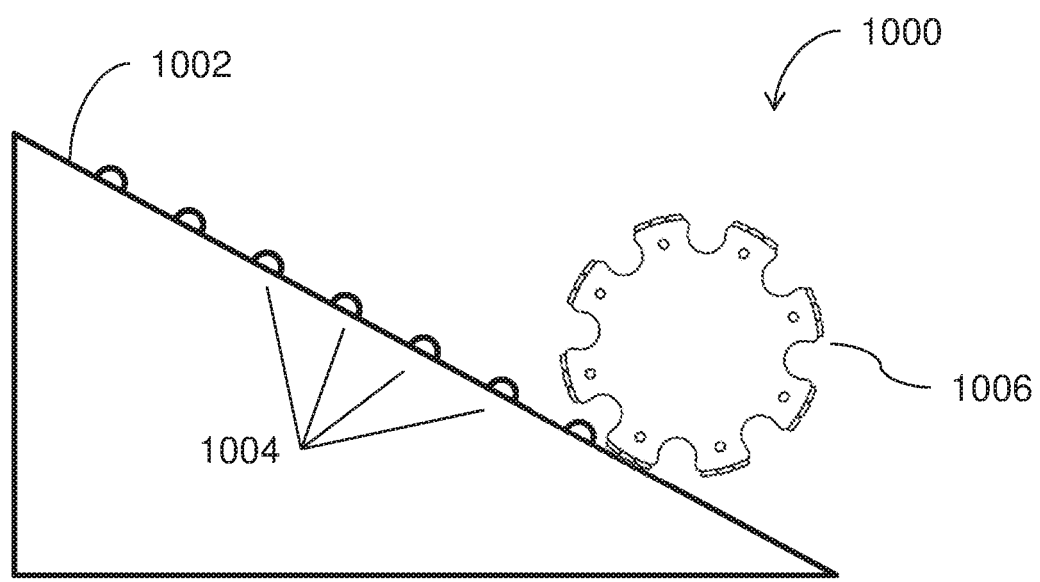
FIG. 10b is a side view of a terrain.

FIG. 10 illustrates an example of an inclined terrain 1000. Specifically, FIG. 10a illustrates a perspective view of the inclined terrain 1000, and FIG. 10b shows a side view of the inclined terrain 1000. The inclined terrain 1000 includes an inclined slope 1002 incorporating multiple protruding, horizontal features 1004. The described features of the robotic vehicle 10 facilitate the easy traverse of inclined terrain 1000. In particular, by employing the method 900, the robotic vehicle 10 maintains alignment of the scalloped portions of the wheels on the left-side and right-side. Thus, as the robotic vehicle 10 is driven up the inclined slope 1002, a scalloped portion of a left-side wheel may cooperatively engage with a horizontal feature 1004 at the same time that a scalloped portion of a right-side wheel may cooperatively engage with the same horizontal feature 1004. An exemplary wheel 1006 is illustrated positioned to cooperatively engage with horizontal feature 1004. As each wheel continues to be driven forward, the wheels are driven up and over the horizontal feature 1004, actively propelling the robotic vehicle 10 up the inclined slope 1002. By the use of the scalloped portions of the wheels, the robotic vehicle 10 is able to effectively "step over" the horizontal features 1004. Because of its "stepping" capability, a wheel as described herein (such as further illustrated in FIG. 5) may be referred to as a wheel-leg, or "WEG." Because of the alignment of the left-side and right-side drive systems, the robotic vehicle 10 is able to easily navigate over the horizontal feature 1004.

Illustrated in FIG. 11 is a programmable computer 1100 suitable for use with the robotic vehicle 10. FIG. 11a illustrates a front view of the programmable computer 1100, and FIG. 11b illustrates a rear view of the programmable computer 1100. The programmable computer 1100 includes an outer housing 1102 that, on its front surface, exposes a display area 1104 and a command button 1106. The rear surface exposes a transparent cover 1108 for an image sensor.

Illustrated in FIG. 12 is a logical view of selected components included within a programmable computer 1200, which may be the same as programmable computer 1100. The components include a microprocessor 1202 operatively coupled to a communication bus 1204. The microprocessor 1202 may be any suitable processor with the ability to execute programmable instructions, including for example a reduced instruction set computer (RISC) processor or a complex instruction set computer (CISC) processor. The microprocessor 1202 may have one or more processing cores, and may have dedicated circuitry for specialized functions including graphics processing. Further coupled to the communication bus 1204 is storage 1206, which may include one or more data storage facilities including a volatile random access memory (RAM) and a nonvolatile random access memory (NVRAM) such as a flash memory. Communication capabilities are provided by a wired communication interface 1210 and a wireless communication interface 1208. The wired communication interface 1210 may be a standards-based communication interface such as, for example, a Universal Serial Bus (USB) or Joint Test Action Group (JTAG) interface. The wireless communication interface 1208 may include, for example, IEEE 802.11 WiFi, IEEE 802.15.4 Zigbee, Bluetooth, Global Standard for Mobile (GSM), Universal Mobile Telecommunications System (UMTS), or Long Term Evolution (LTE). Some embodiments may include multiple wired communication interfaces or multiple wireless communication interfaces.

Also coupled to the communication bus 1204 is an image sensor 1212. The image sensor 1212 may be any suitable sensor type, such as a charge-coupled device (CCD) sensor or complementary metal-oxide-semiconductor (CMOS) sensor, and may provide a video capture mode capable of producing 640×480 pixel color images with at least 30 frames per second. In other embodiments, the resolution and frame rate may each be higher or lower.

The communication bus 1204 is depicted as a single bus, however multiple distinct buses may also be employed. For example, a dedicated bus may couple the microprocessor 1202 to a volatile random access memory, while a different bus may couple the microprocessor 1202 to a nonvolatile random access memory.

Figure 13:
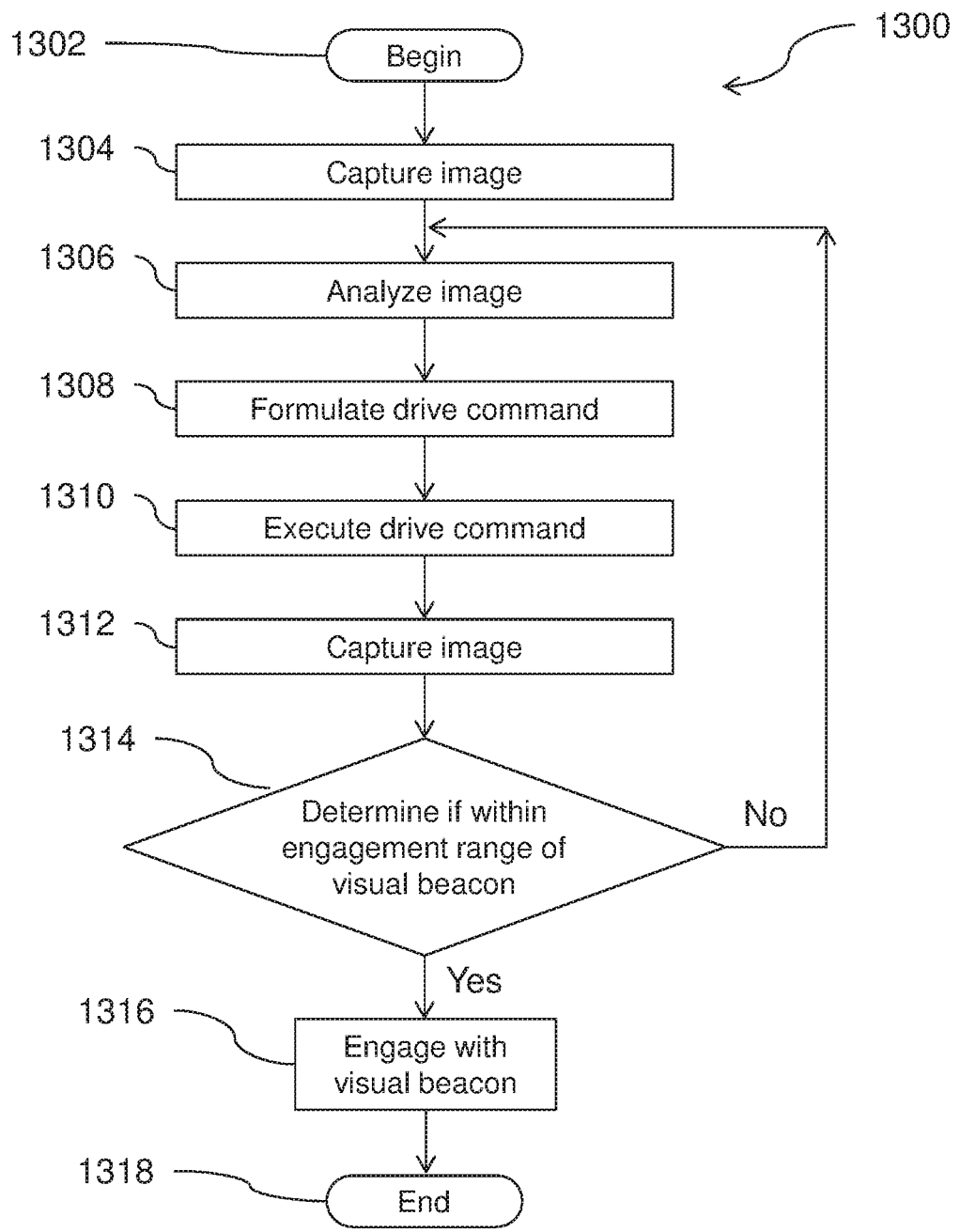
FIG. 13 is a process flow diagram for autonomous control of a robotic vehicle.

Illustrated in FIG. 13 is an exemplary method 1300 for an autonomous control program for the robotic vehicle 10. The method 1300 begins in step 1302. Next, in step 1304, an image is captured using an image sensor. The captured image is preferably a color picture having dimensions of about at least about 640×480 pixels. In other embodiments, the image may be of higher or lower resolution.

In step 1306, the captured image is analyzed to determine the location of a visual beacon. The visual beacon may be, for example, a light source such as an light emitting diode (LED). The LED may be differently colored depending on the situation, for example, the color may be indicative of whether the visual beacon should be approached and engaged with, or whether the visual beacon should be avoided. In one embodiment, the LED may be either blue or red in color.

Assuming that the color of the visual beacon indicates that the visual beacon may be approached and engaged with, then in step 1308, a drive command is formulated to move the robotic vehicle 10 toward the visual beacon. Then in step 1310, the drive command is executed. Execution of the drive command in step 1310 may include performing the process of FIG. 9, for example.

Then in step 1312, a new image is captured, using once again an image sensor. The new image is preferably of the same resolution as the image captured in step 1304.

Next in step 1314, the new image is analyzed to determine whether the robotic vehicle 10 is within sufficiently close physical proximity of the visual beacon such that the robotic vehicle 10 can engage with the visual beacon. For example, the apparent size of the visual beacon may be compared to an expected size. The proximity determination may also be made using information for an additional sensor, for example, using an infrared proximity sensor or distance measuring sensor.

If in step 1314 the robotic vehicle 10 is determined to be within the engagement range of the visual beacon, then the method continues to step 1316, where the robotic vehicle 10 engages with the visual beacon. The engagement may include, for example, pressing a button associated with the visual beacon using the arm 28. The method then continues to step 1318, where the method ends.

If in step 1314 the robotic vehicle 10 is determined not to be within the engagement range of the visual beacon, then the method returns to repeat beginning at step 1306, where the new image captured in step 1312 is analyzed to determine the location of the visual beacon.

Figure 14:
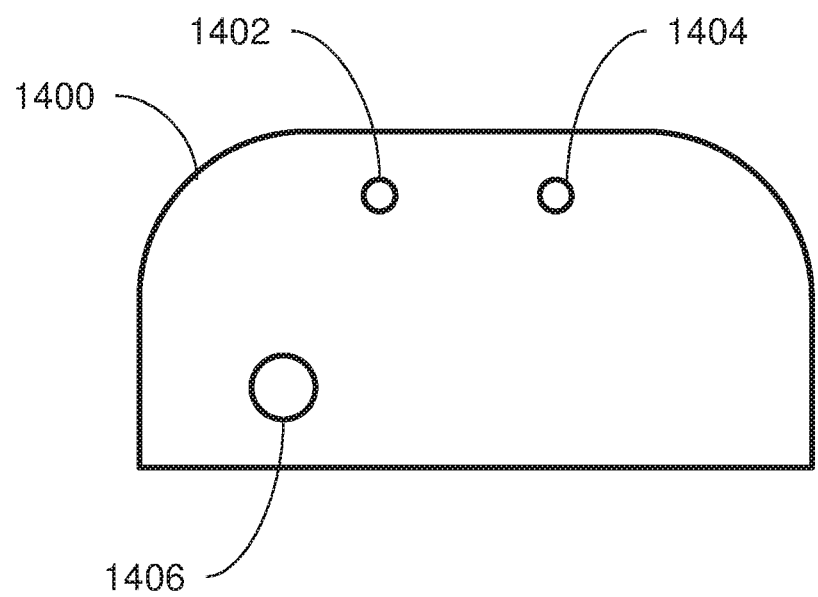
FIG. 14 is a front side view of an illustrative visual beacon.

FIG. 14 illustrates an exemplary visual beacon 1400. The visual beacon 1400 includes a first light source 1402 and a second light source 1404. The visual beacon 1400 may further include additional light sources. Each light source may be any suitable generator of light, and preferably the light sources 1402, 1404 have a generally omnidirectional light output. The light source may be, for example, an LED, a fluorescent lamp, or an incandescent light bulb. The first light source 1402 may be a different color than the second light source 1404. For example, the first light source 1402 may be a blue color and the second light source 1404 may be a red color.

The visual beacon 1400 further includes a button 1406. Pressing the button 1406 may activate a feature of the visual beacon 1400. For example, pressing the button 1406 may cause a change in the activation, or activation level, of the first light source 1402, the second light source 1404, or both. In certain games or competitions, it may be desirable to activate the visual beacon 1400 in a specific way.

The foregoing detailed description is to be clearly understood as being given by way of illustration and example only, the spirit and scope of the present invention being limited solely by the appended claims.

What is claimed is:

1. Robotic vehicle apparatus comprising:
   a platform having a left side and a right side, said left side including:
   a left-side motor,
   a left-side axle operatively connected to said left-side motor,
   a left-side rotational sensor operatively connected to said left-side motor or to said left-side axle, the left-side rotational sensor operable to provide a left-side angular position value in the range of 0 to n, and
   a left-side wheel operatively connected to said left-side axle, the left-side wheel having a self-repeating pattern around its outer circumference that repeats m times, the left-side wheel being operable to rotate in 1:1 synchrony with the left-side motor;
   said right side including:
   a right-side motor,
      a right-side axle operatively connected to said right-side motor, a right-side rotational sensor operatively connected to said right-side motor or to said right-side axle, the right-side rotational sensor operable to provide a right-side angular position value in the range of 0 to n, and
      a right-side wheel operatively connected to said right-side axle, the right-side wheel having a self-repeating pattern around its outer circumference that repeats m times, the right-side wheel being operable to rotate in 1:1 synchrony with the right-side motor;
      a forward-facing image sensor fixedly mounted on the platform;
      an arm mounted on the platform, the arm comprising:
      at least two rotatable joints providing for controllable movement in at least two independent axes,
      at least one extendable section, and
      at least one hook;
   a programmable computer including a processor, a wired communication interface, a wireless communication interface, and a nonvolatile electronic data storage medium, the nonvolatile electronic data storage medium comprising executable instructions that when executed by the processor cause the robotic vehicle, under direction and control of the processor, to perform steps comprising:
      initializing the left-side rotational sensor to produce a first left-side angular position value of 0,
      initializing the right-side rotational sensor to produce a first right-side angular position value of 0,
      receiving a movement command,
      selectively driving at least one of the left-side motor or the right-side motor in accordance with the movement command,
      obtaining a second left-side angular position value from the left-side rotational sensor and a second right-side angular position value from the right-side rotational sensor,
      calculating an absolute difference between the second left-side angular position value and the second right-side angular position value,
      calculating an angular offset value equal to the absolute difference modulo $((n+1)/m)$,
      comparing the angular offset value to a threshold,
      if the angular offset value exceeds the threshold, selectively driving at least one of the left-side motor or the right-side motor in an amount proportional to the angular offset value, and
      repeating the obtaining, calculating, and comparing steps zero or more times until the angular offset value is below the threshold, thereby maintaining the self-repeating patterns on the left-side wheel in relative alignment with the self-repeating pattern on the right-side wheel; and
   a rechargeable electric energy storage device with a capacity to power the programmable computer, left-side motor, and right-side motor for at least fifteen minutes.

2. The robotic vehicle apparatus of claim 1, wherein every wheel is a WEG.

3. The robotic vehicle apparatus of claim 1 in which the nonvolatile electronic data storage medium comprises further executable instructions that when executed cause the robotic vehicle to perform steps comprising:
   obtaining an image from the image sensor, the image including a representation of a beacon;
   analyzing the image;
   formulating a drive command;
   executing the drive command;
   determining whether the robotic vehicle is within range to activate a feature of the beacon;
   if the robotic vehicle is within range to activate a feature of the beacon, activating the beacon;
   if the robotic vehicle is not within range to activate a feature of the beacon, repeating the analyzing, formulating, executing, and determining steps.

4. The robotic vehicle apparatus of claim 3, wherein the determining step comprises obtaining a second image from the image sensor.

5. The robotic vehicle apparatus of claim 1 further comprising at least three left-side wheels and at least three right-side wheels.

6. The robotic vehicle apparatus of claim 5, wherein at least one left-side wheel and at least one right-side wheel are vertically offset from at least two left-side wheels and two right-side wheels.

7. The robotic vehicle apparatus of claim 1 in which the wired communication interface is a USB interface.

8. The robotic vehicle apparatus of claim 1 in which the programmable computer is a smartphone.

9. The robotic vehicle apparatus of claim 1 in which n is 279.

10. The robotic vehicle apparatus of claim 1 in which m is 8.

11. The robotic vehicle apparatus of claim 1 in which the wireless communication interface is an IEEE 802.11 interface.

12. The robotic vehicle apparatus of claim 1 further comprising a first gear affixed to the left-side axle and a second gear affixed to the left-side wheel.

13. The robotic vehicle apparatus of claim 12 wherein the first gear and the second gear have an equal number of teeth.

14. The robotic vehicle apparatus of claim 13 further comprising a third gear affixed to the right-side axle and a fourth gear affixed to the right-side wheel.

15. The robotic vehicle apparatus of claim 14 wherein the third gear and the fourth gear have an equal number of teeth.

16. The robotic vehicle apparatus of claim 15 wherein the first gear and the third gear have an equal number of teeth.

17. The robotic vehicle apparatus of claim 1 further comprising an idler gear.

18. The robotic vehicle apparatus of claim 1 further comprising a plurality of front fenders.

19. The robotic vehicle apparatus of claim 1 wherein each of the left-side wheel and the right-side wheel includes a plurality of tread links.

* * * * *